Aug. 22, 1933.  C. P. WELDON  1,923,767
LUBRICATOR
Filed Oct. 17, 1928

INVENTOR:
CHICHESTER P. WELDON,
BY Gales P. Moore
HIS ATTORNEY.

Patented Aug. 22, 1933

1,923,767

UNITED STATES PATENT OFFICE 1,923,767

LUBRICATOR

Chichester P. Weldon, Bristol, Conn., assignor to The New Departure Manufacturing Company, Bristol, Conn., a Corporation of Connecticut Application October 17, 1928. Serial No. 313,041

1 Claim. (Cl. 184—90)

This invention relates to lubricators and comprises all the features of novelty herein disclosed in connection with a lubricating plug for bicycle hubs and the like.

An object of the invention is to provide an improved device for supplying lubricant to a rotary member. Another object is to provide a cheap and efficient device of this character such that lubricant can be easily and quickly introduced and retained against leakage and protected against admission of foreign matter.

Figure 1:
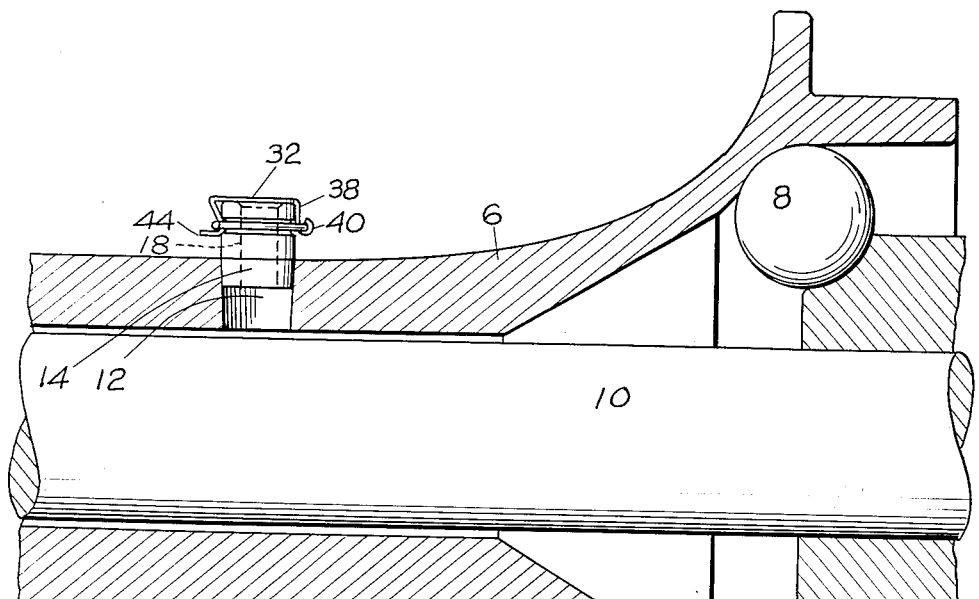

To these ends and to improve generally and in detail upon devices of this character, the invention further consists in the various matters hereinafter disclosed and claimed. In its broader aspects, the invention is not necessarily limited to the specific construction selected for illustrative purposes in the accompanying drawing in which Fig. 1 is a sectional view of a bicycle hub, enlarged, showing the improved lubricator in side elevation.

Figure 2:
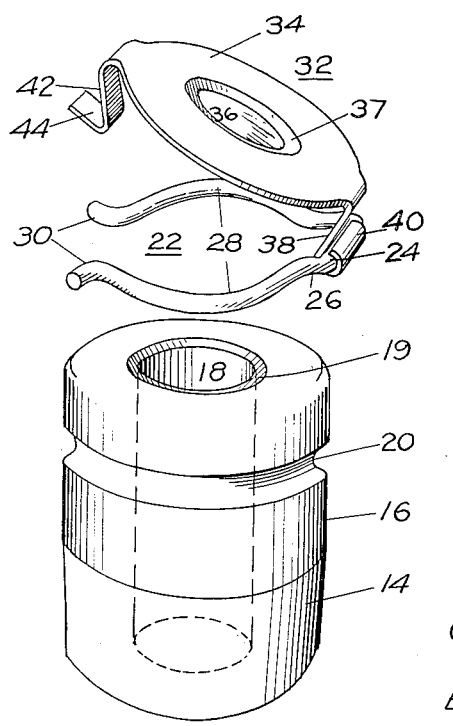

Fig. 2 is a perspective view showing the cover and body of the lubricator separated and enlarged.

The numeral 6 indicates a bicycle hub journalled in any suitable way, as by ball bearings 8, for rotation around an axle bolt 10. The improved lubricator is attached to the hub for conducting lubricant to the enclosed bearings. The hub has a radial opening 12 into which the slightly tapered stem 14 of a plug 16 is driven. The plug is preferably made of brass and is hollow, a round lubricant passage or bore 18 extending through it lengthwise. The end of the bore is slightly chamfered or countersunk at 19 and the outer peripheral edge of the plug is slightly rounded. The body of the plug has a narrow groove or channel 20 in its side walls, the channel preferably extending around it near its outer end and, in this channel, is snapped a generally U-shaped spring clip 22, preferably bent from spring wire.

The clip 22 comprises a straight base portion 24, short side sections 26 extending at substantially right angles to the base portion, arcuate holders or side arms 28 which fit in the channel, and outwardly bent diverging ends or cams 30. The diverging ends 30 facilitate snapping the clip on the plug by engaging the bottom wall of the channel and camming the holders or side arms outwardly around the plug when the clip is pushed endwise in the plane of the channel. The short side sections 26 space the base portion 24 a little way from the plug to form a hinge pin for a cover 32.

The cover 32 is preferably bent from a thin piece of flat spring steel. The top of the cover is substantially circular and flat and comprises an annular portion 34 resting on the end face of the plug outside the passage or bore 18 and a central circular depression 36 which accurately fits in said opening. The depression has a slanting side wall 37 to fit the countersink 19 of the opening. A hinge arm 38 is bent downwardly from the top and is curled at the end to form an eye 40 surrounding the base portion or hinge pin 24 of the clip. The free end of the cover has a downwardly and inwardly bent spring latching arm or lip 42 terminating in an outwardly bent finger piece 44. When the cover is swung down to closing position, the latch arm 42 bends outwardly and snaps in under the upper or outer side wall of the channel 20, between the ends 30 of the clip, and holds the cover closed under tension. The finger piece 44 enables the cover to be easily raised whenever lubricant is to be introduced into the plug. When the plug is cylindrical and has a peripheral channel, as illustrated and as preferred, the cover structure can be swivelled as a unit on the plug to arrange the cover for opening up in any desired or convenient direction, the side arms 28 of the spring clip then sliding around in the channel to bring the hinge pin 24 to the desired location. The open cover serves as a handle not only when the spring clip is cammed on the plug but also serves to hold the plug in line with the opening 12 when the attaching stem 14 is pressed into the opening by a ram or plunger.

I claim:

In a device of the character described, a lubricator comprising a plug having a tapered stem adapted to be driven into an opening, the plug including the stem having a passage extending lengthwise therethrough and terminating in a countersink, the plug having a channel around it, a spring clip having side arms terminating in outwardly diverging cam portions adapted to snap around the plug when the clip is pushed endwise in the plane of the channel, a cover hinged to the clip and having a latch arm engaging the channel between the cam portions, the cover comprising an annular flat portion to engage the annular end face of the plug and a central depression with a slanting side wall fitting the countersink; substantially as described.

CHICHESTER P. WELDON.